United States Patent [19]

Charneski

[11] Patent Number: 5,133,269
[45] Date of Patent: Jul. 28, 1992

[54] PLANT HOLE DIGGER WITH CYLINDRICAL CUTTER

[76] Inventor: Robert Charneski, 525 Lincoln Ave., Manville, N.J. 08835

[21] Appl. No.: 548,219

[22] Filed: Jul. 5, 1990

[51] Int. Cl.$^5$ .............................................. F16L 45/00
[52] U.S. Cl. ..................................... 111/116; 172/25; 172/111; 172/519; 175/335; 175/385; 175/19; 175/21
[58] Field of Search .................. 111/116; 172/25, 111, 172/519, 19, 21, 22; 175/394, 335, 385, 386, 387; 294/50.6; 408/204, 206, 207, 210, 224

[56] References Cited

U.S. PATENT DOCUMENTS

| | | | |
|---|---|---|---|
| 1,866,073 | 6/1930 | Aberle | 172/22 |
| 2,673,717 | 3/1954 | Bacon | 175/394 |
| 3,224,512 | 7/1963 | Alexander | 172/22 |
| 3,356,168 | 12/1967 | Johnson | 175/394 |
| 3,447,616 | 12/1966 | Granat | 175/394 |
| 3,951,212 | 4/1976 | Hallman | 172/19 |
| 3,998,283 | 12/1976 | Chitwood et al. | 175/394 X |
| 4,669,928 | 6/1987 | Mediavilla | 408/206 |
| 4,723,802 | 2/1988 | Fambrough | 175/385 X |
| 4,807,710 | 2/1989 | Greely | 175/394 |

Primary Examiner—Randolph A. Reese
Assistant Examiner—Tim Aberle
Attorney, Agent, or Firm—Robert J. Ferb

[57] ABSTRACT

This invention is comprised of an auger with fixed or replaceable tips designed to cut openings through sheet plastic or fiberglass ground coverings and drill, in a continuous operation, an appropriate diameter hole for planting seedlings or seeds as may be desired. This invention is comprised of a shaft with spiral auger and a cutting tip with a cylindrical cutting edge and a recessed drilling point as an assembly which is removably attached to the shaft with flights on it. The device can be driven by a conventional electric drill with a one-half inch chuck.

9 Claims, 3 Drawing Sheets

U.S. Patent  July 28, 1992  Sheet 1 of 3  5,133,269
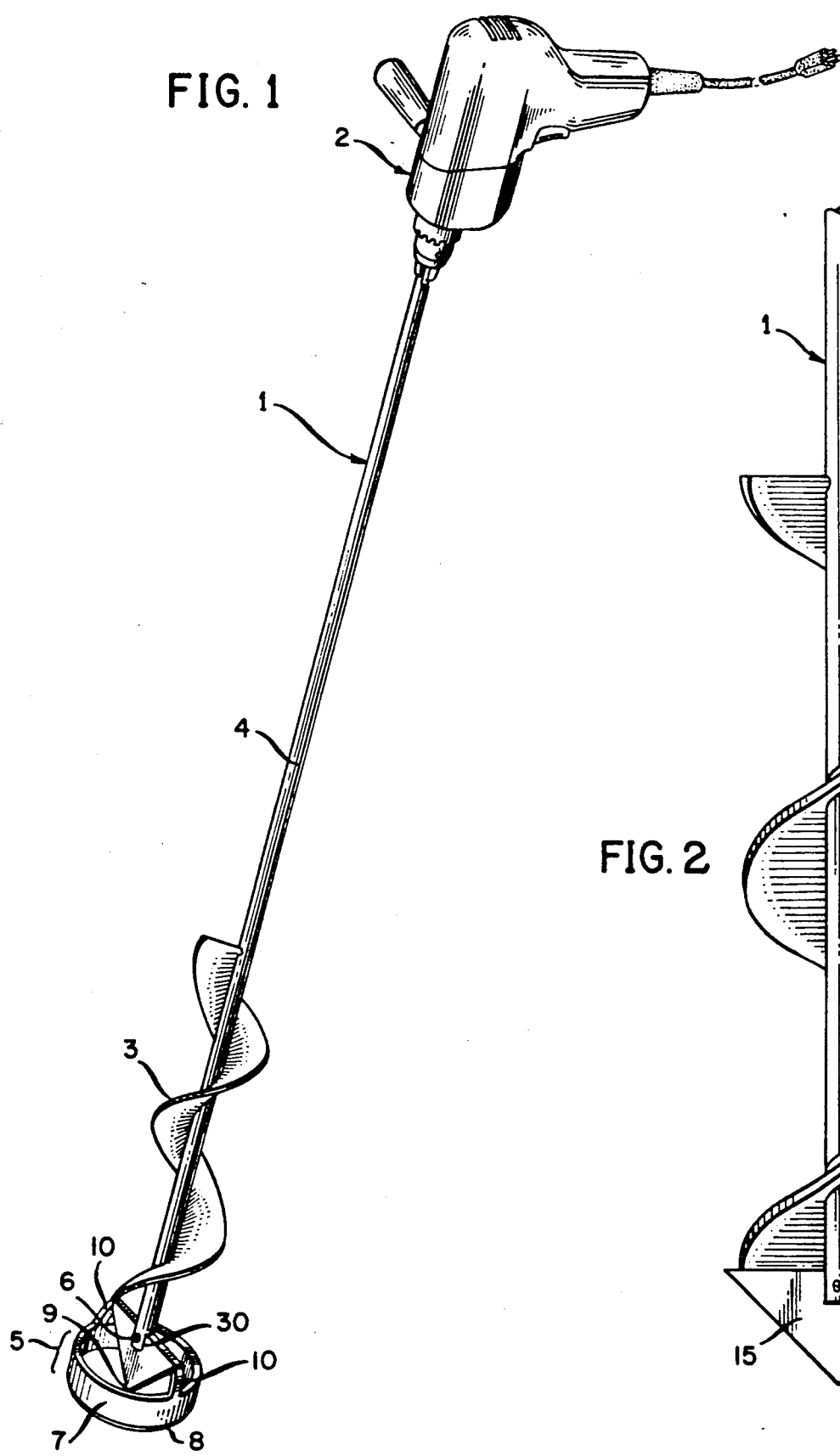
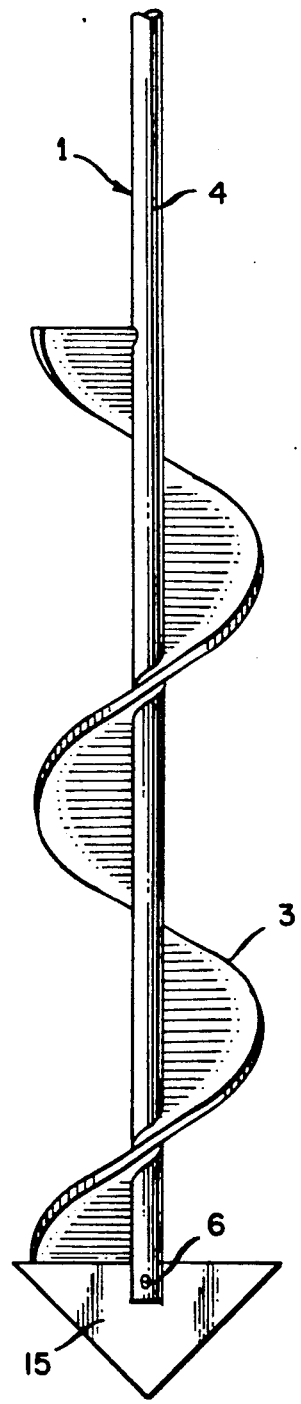

FIG. 4
FIG. 3
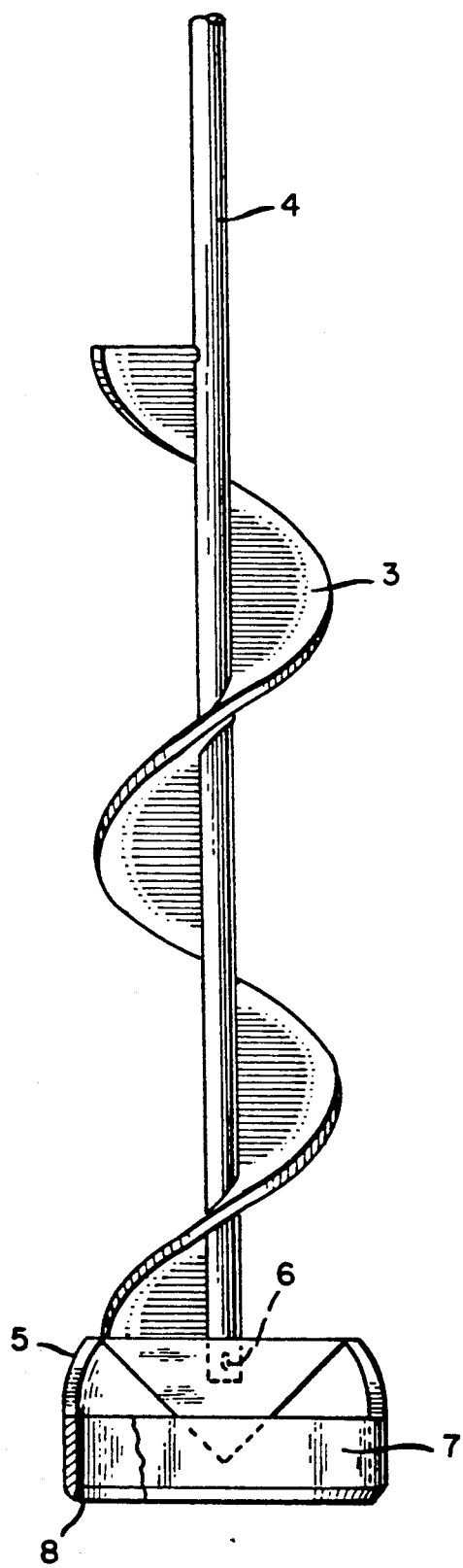
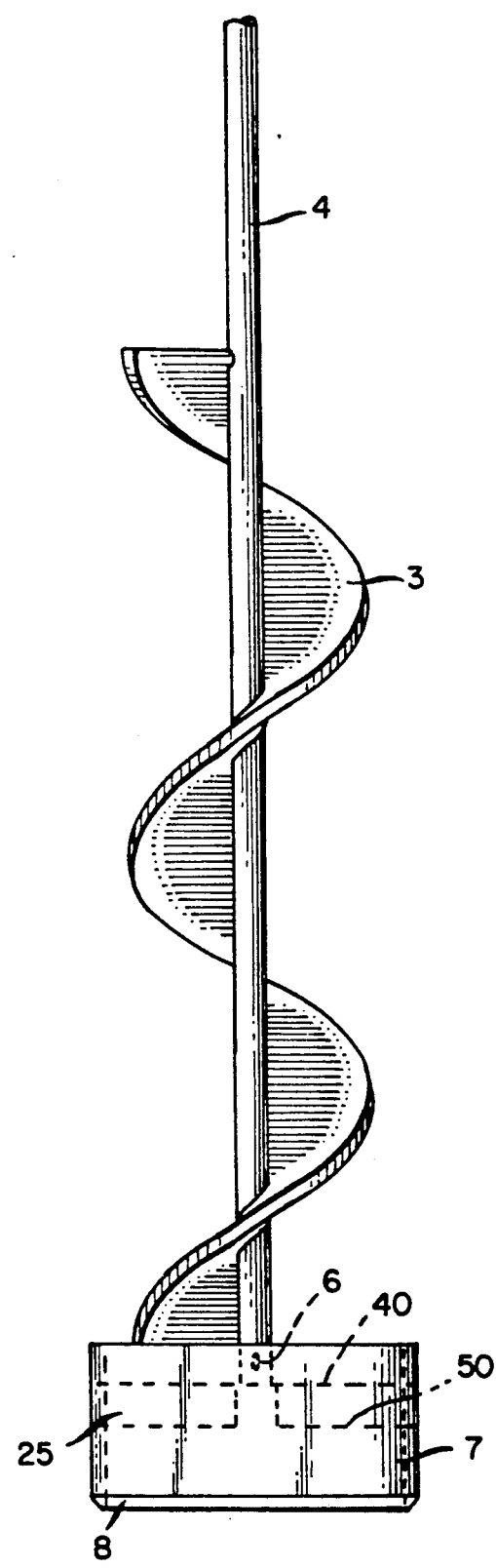

PLANT HOLE DIGGER WITH CYLINDRICAL CUTTER

This invention generally relates to auger type devices used for boring holes in soil, and is particularly directed at devices for boring small shallow holes for the planting of small plants or seeds for private gardens and small commercial gardening enterprises.

BACKGROUND OF INVENTION

This invention relates generally to the field of augers used to drill or bore shallow holes in the ground. There are in the art many well known manual and motor driven auger-type devices used for boring post holes for fences, signs, and other items. These augers are generally designed to drill large diameter holes in the ground in the range of 6 to 12 or more inches in diameter, are typically driven by a gasoline powered engine, and often are designed for two person operation. While these auger-type devices are capable of boring holes that are smaller than the typical range for which they were designed, they tend to be large, expensive, and difficult to move from one drilling point to the next. For planting seeds and vegetable garden plants such as tomatoes, peppers, etc., it is desirable to have openings in the soil approximately 3 to 5 inches in diameter and 4 to 8 inches deep. It is also a common practice to use plastic sheets or thin fiberglass batting to cover the ground around locations where seeds or starter plants are planted to reduce the growth of weeds and to retain soil moisture thereby enhancing the growth of the desirable garden plants. Also known in the art are auger-type devices designed for drilling shallow holes primarily for planting of bulbs, such as tulip bulbs. While these smaller tulip bulb-type augers have some of the characteristics desirable for vegetable garden planting, they are incapable of allowing the gardener to penetrate the plastic film or fiberglass batting and dig or bore a hole beneath the covering into the soil for planting. If a conventional auger is used to try to penetrate the plastic film or fiberglass batting, rather than cutting through the cover sheet, conventional augers grab the sheet and wind it around the auger. When this winding occurs, the sheet is often ripped. Even if the sheet is not ripped, the sheet must be unwound and replaced on the ground. This laborious replacement of the sheet completely defeats any labor saving expected from the use of an auger. The use of augers to perform this hole drilling function is desirable because it substantially reduces the time required for making holes and, with a properly configured auger, allows the hole to be drilled with the gardener in the standing position. Being able to stand during the drilling operation is more desirable for a gardener than having to bend or kneel down while the hole is being dug and having to get up repeatedly and move to the next position to dig the next hole.

BRIEF DESCRIPTION OF INVENTION

This invention has been developed in order to provide a device specifically designed to overcome the shortcomings of the prior art. The improved plant hole digger provides for a circular cutter as an integral part of the digging device to permit a clean penetration of the plastic or fiberglass soil cover and a subsequent boring of a hole appropriate for the planting of the seedling or seeds as required. In addition, in an alternative embodiment, this invention can be used to penetrate plastic or fiberglass soil coverings without boring a hole for planting seeds which would benefit from the use of a ground cover but do not require a hole for planting. The design of this invention also permits its ready use without the plastic or fiberglass covers by manually replacing the cutting device on the auger with a conventional point so that it can be used in the conventional manner on uncovered soils. The invention thus permits an essentially one-step operation of penetrating the soil cover and drilling the appropriate hole for planting from the standing position without the risk of winding up and tearing the soil cover as compared to prior art devices. This device is designed to be used with a conventional driving device such as a half-inch electric drill as its power source.

OBJECTS OF THE INVENTION

It is an object of the present invention to provide a soil auger for the amateur or small commercial gardener that is light in weight and suitable for single-person operation.

It is a further object of this invention to provide a soil auger which incorporates a device for cutting through sheets of plastic or fiberglass soil covering.

It is a further object of this invention to provide a soil auger with replaceable points.

It is a further object of this invention to provide an inexpensive device easily affordable by the amateur gardener to be used with a conventional hand-held electrically driven drill to penetrate soil covers and or bore holes for planting seeds or seedlings.

It is also an object of this invention to provide a soil-type auger that permits holes to be drilled from the standing position to reduce gardeners' fatigue in performing the hole digging step in planting a garden.

DESCRIPTION OF THE DRAWINGS

FIG. 1 is a drawing showing the plant hole digger attached to a conventional drill.

FIG. 2 is a drawing showing the plant hole digger with a conventional auger tip.

FIG. 3 is a drawing showing an alternative embodiment of the plant hole digger.

FIG. 4 is a drawing showing an alternative embodiment of the sheet cutter.

DETAILED DESCRIPTION OF THE DRAWINGS

Figure 5:
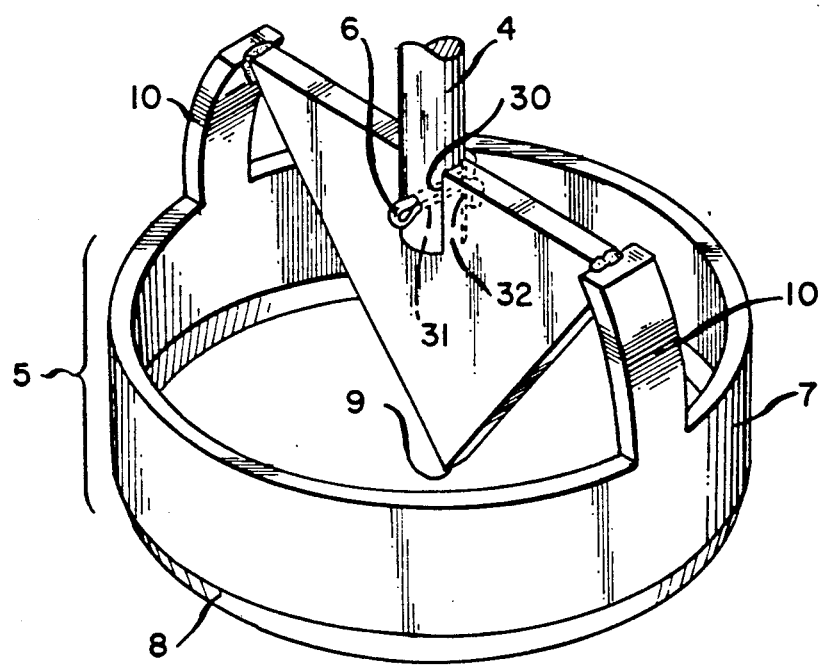
FIG. 5 is a drawing showing the plant hole digger tip.

FIG. 1 illustrates auger assembly 1 which is attached by conventional means to drive device 2, (such as an electric drill). Auger assembly 1 incorporates auger 3 attached to shaft 4 to which removable tip 5 is attached by conventional means such as slot 30 which engages auger point 9. As more particularly depicted in FIG. 5 cotter pin 6 passes through hole 31 in shaft 4 and through cooperating hole 32 in point 9 to secure tip 5 to shaft 4. Tip 5 incorporates cylindrical cutter 7 which is attached to auger point 9 by support braces 10. Cylindrical cutter 7 incorporates beveled cutting edge 8 which, when brought into contact with a plastic or fiberglass soil cover, cuts a circular hole through the soil cover. As auger assembly 1 is pressed further into the soil, auger point 9 penetrates the soil and begins the boring process. As auger point 9 penetrates the soil, auger 3 carries the soil out of hole being drilled.

As shown in FIG. 2, auger assembly 1 may also be fitted with conventional auger point 15 when the user has no need to cut plastic or fiberglass soil covers so that holes can be drilled in a conventional manner.

Figure 6:
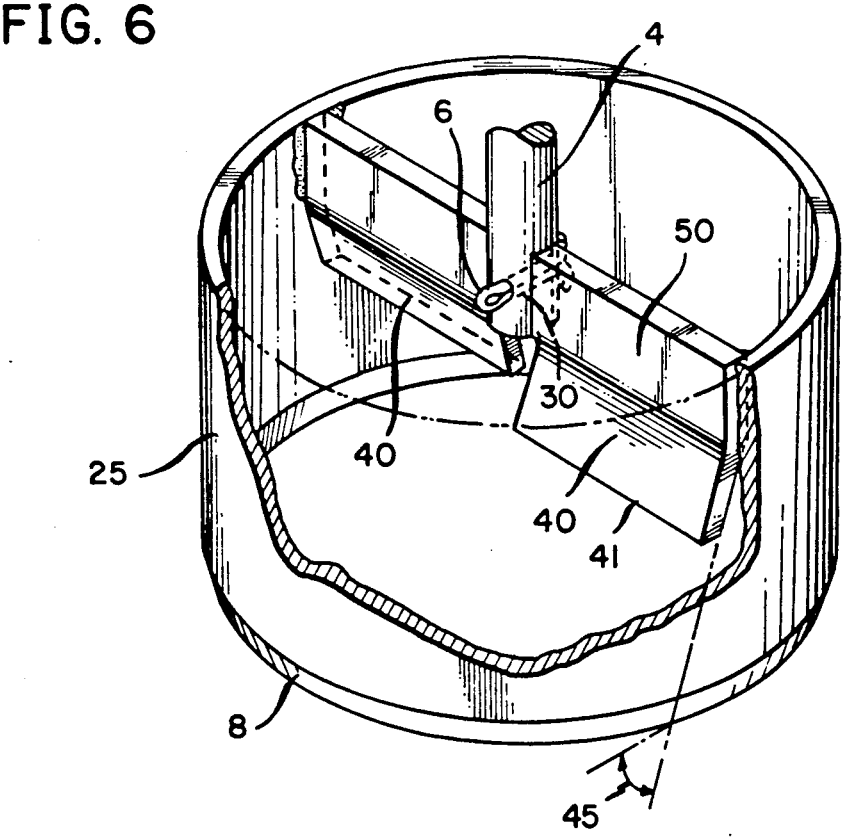
FIG. 6 is a drawing showing an alternative embodiment of the plant hole digger tip.

FIG. 3 illustrates an alternative embodiment wherein tip 25 is removably mounted on shaft 4 by conventional means such as that illustrated in FIG. 6. In this embodiment tip 25 incorporates cylindrical cutter 7 with beveled cutting edge 8 located at the lower edge of cylindrical cutter 7. As illustrated in FIG. 6 tip 25 contains auger blades 40 which are fixedly attached to the inner side of cylindrical cutter 7. Auger blades 40 make a blade angle 45 of approximately 30 to 45 degrees between the plane of beveled cutting edge 8 and the plane of each blade 40. Blades 40 are fixedly attached to support 50. Support 50 is fixedly attached to the inner side of cylindrical cutter 7 so that support 50 is approximately level with the upper edge of cylindrical cutter 7. Lower blade edge 41 is located approximately one inch from beveled cutting edge 8 of cylindrical cutter 7. Tip 25 is attached to shaft 4 in the same manner as tip 5 illustrated in FIG. 5 wherein hole 31 in shaft 4 is aligned with cooperating hole 32 in support 50 and cotter pin 6 is inserted through shaft 4 and support 50 to attach tip 25 to shaft 4.

FIG. 4 illustrates an alternative embodiment illustrating cutting device 35 which incorporates cylindrical cutter 7 which is attached to shaft 4 by conventional means such as that described in FIG. 5. Cylindrical cutter 7 contains beveled cutting edge 8 and is designed to cut through plastic or fiberglass soil covers without the capability of boring holes into the soil below.

Tip 5, tip 25, point 5 or cutting device 35 may be removably attached to shaft 4 by a conventional threaded connection which is designed to tighten upon resistance to rotation of cylindrical cutter 7 when it contacts the soil cover.

While it is desirable for beveled cutting edge 8 on cylindrical cutter 7 to be sharp, a sharp edge quickly dulls after contact with the soil during the normal boring process. It has been found that even after beveled cutting edge 8 has been dulled to a "butter knife" edge that the cutting of the plastic or fiberglass soil cover is performed in a satisfactory manner.

In the embodiment illustrated in FIG. 1 cylindrical cutter 7 is approximately one inch high and the lower end of auger point 9 is approximately ¼ to ½ inch above lower beveled cutting edge 8 of cylindrical cutter 7.

In the embodiment illustrated in FIG. 3 cylindrical cutter 7 is approximately two inches high and lower edge 41 of auger blades 40 are approximately one inch above lower beveled cutting edge 8 of cylindrical cutter 7. While FIG. 3 and FIG. 6 illustrate the use of two auger blades as few one or if desirable more than two can be used and are within the contemplation of this invention. In addition, it is preferred that one of the auger blades lines up with the auger on shaft 4.

Preferably, the shaft is approximately 20 to 40 inches long in all embodiments.

While the embodiments of this invention have described a cutting device which is removably attached to the shaft, it is within the contemplation of the invention that the cutting device could be fixedly attached to the shaft. It is also within the contemplation of this invention that the device for cutting through sheets as illustrated in FIG. 4 could be attached to a shaft without flights.

The description of the invention disclosed herein is illustrative of the preferred embodiments of the invention and it is intended to illustrate the same. It is understood that alternative sizes and means of attachment are within the contemplation of this invention.

I claim:

1. An improved plant hole digging device which is comprised of a shaft to which is attached a radially disposed auger, a tip which contains an auger point and a cylindrical cutter; said cylindrical cutter having a longitudinal axis coaxial with the axis of said shaft and which is fixedly connected to said auger point by at least one support means and wherein said cylindrical cutter has a beveled cutting edge around its lower perimeter.

2. An improved plant hole digging device as described in claim 1 wherein said tip is removably attached to said shaft.

3. An improved plant hole digging device as described in claim 2 wherein said cylindrical cutter is approximately 3 to 5 inches in diameter, said shaft is approximately 20 to 40 inches in length, said cylindrical cutter has a height of approximately 1 inch, said auger has a diameter of approximately ½ inch less than the diameter of said cylindrical cutter, and the lower end of said auger point is located approximately ¼ to ½ inch above said beveled cutting edge.

4. An improved plant hole digging device which is comprised of a shaft to which is attached an anger blade and a cutting device which contains a cylindrical cutter; said cylindrical cutter having a longitudinal axis coaxial with the axis of said shaft and which contains a beveled cutting edge around its lower perimeter, said cylindrical cutter being fixedly attached to said shaft by at least one support means.

5. An improved plant hole digging device as described in claim 4 in which said cutting device is removably attached to said shaft.

6. An improved plant hole digging device as described in claim 5 wherein said cutting device is approximately 3 to 5 inches in diameter, said shaft is approximately 20 to 40 inches in length and said cylindrical cutter has a height of approximately one inch.

7. An improved plant hole digging device which is comprised of a shaft to which is attached a radially disposed auger, a tip which contains a cylindrical cutter; said cylindrical cutter having a longitudinal axis coaxial with the axis of said shaft and which is fixedly connected to said shaft by a support said support being attached to the inner edge of an auger blade; said auger blade having a radially inward edge and radially outward edge; said auger blade is fixedly attached to the inside of said cylindrical cutter at its outer edge and which is fixedly attached to said support at its inner edge.

8. An improved plant hole digging device as described in claim 7 wherein set of cutting device contains at least one auger blade.

9. An improved plant hole digging device as described in claim 7 wherein said cylindrical cutter is approximately 3 to 5 inches in diameter, said shaft is approximately 20 to 40 inches in length, said cylindrical cutter has a height of approximately 1 inch, said auger blades are disposed approximately 1 inch above the lower edge of said cylindrical cutter, at least two auger blades are disposed within said cylindrical cutter and said cutting device is removably attached to said shaft.

* * * * *